United States Patent
Anthony

(10) Patent No.: US 11,236,779 B2
(45) Date of Patent: Feb. 1, 2022

(54) HIGH-SPEED BEARING WITH GROOVED AND CYLINDRICAL RACES

(71) Applicant: AKTIEBOLAGET SKF, Gothenburg (SE)

(72) Inventor: Don L. Anthony, Warren, PA (US)

(73) Assignee: AKTIEBOLAGET SKF, Gothenburg (SE)

(\*) Notice: Subject to any disclaimer, the term of this patent is extended or adjusted under 35 U.S.C. 154(b) by 0 days.

(21) Appl. No.: 17/015,573

(22) Filed: Sep. 9, 2020

(65) Prior Publication Data

US 2021/0088079 A1 Mar. 25, 2021

Related U.S. Application Data

(60) Provisional application No. 62/904,098, filed on Sep. 23, 2019.

(51) Int. Cl.
*F16C 19/52* (2006.01)
*F16C 33/58* (2006.01)
(Continued)

(52) U.S. Cl.
CPC ............ *F16C 19/525* (2013.01); *F16C 19/06* (2013.01); *F16C 19/08* (2013.01); *F16C 23/08* (2013.01);
(Continued)

(58) Field of Classification Search
CPC ........ F16C 19/08; F16C 19/525; F16C 23/08; F16C 31/04; F16C 33/303; F16C 33/585; F16C 33/62
See application file for complete search history.

(56) References Cited

U.S. PATENT DOCUMENTS 4,997,297 A * 3/1991 Blount .................... F16C 19/26
384/476
5,524,343 A * 6/1996 Blanks .................... F16C 25/06
29/407.05

(Continued)

FOREIGN PATENT DOCUMENTS

| EP | 0927651 A2 | 7/1999 |
| FR | 2439902 A1 | 5/1980 |
| JP | H08312655 A | 11/1996 |

OTHER PUBLICATIONS

Search report from the British Patent Office dated Feb. 5, 2021 in related application No. GB2014005.9.

*Primary Examiner* — James Pilkington
(74) *Attorney, Agent, or Firm* — J-Tek Law PLLC; Scott T. Wakeman; Mark A. Ussai

(57) ABSTRACT

A high-speed shaft assembly includes a shaft of a first material and an outer member of a second material disposed about the shaft, the shaft or outer member being rotatable about an axis. The two materials have substantially different coefficients of thermal expansion such that the shaft and/or the outer member is relatively displaceable along the axis at temperatures over 120° C. and less than −18° C. A bearing inner ring is disposed about the shaft and has an outer race which is a cylindrical surface or an annular groove. A bearing outer ring is disposed about the inner ring and coupled with the outer member. The outer ring has an outer race which is the other one of the cylindrical surface and the groove. A plurality of balls disposed between the races are displaceable axially along the cylindrical race surface during relative displacement of the shaft and outer member.

9 Claims, 9 Drawing Sheets

(51) Int. Cl.
*F16C 19/08* (2006.01)
*F16C 19/06* (2006.01)
*F16C 33/30* (2006.01)
*F16C 33/62* (2006.01)
*F16C 23/08* (2006.01)

(52) U.S. Cl.
CPC .......... *F16C 33/303* (2013.01); *F16C 33/585* (2013.01); *F16C 33/62* (2013.01); *F16C 2202/22* (2013.01)

(56) References Cited

U.S. PATENT DOCUMENTS

| | | | | |
|---|---|---|---|---|
| 6,142,674 | A | * 11/2000 | Bayer | F16C 33/32 384/482 |
| 8,425,120 | B2 | * 4/2013 | Konno | F16C 33/7843 384/492 |
| 2008/0247698 | A1 | * 10/2008 | Albert | F16C 27/04 384/493 |

* cited by examiner

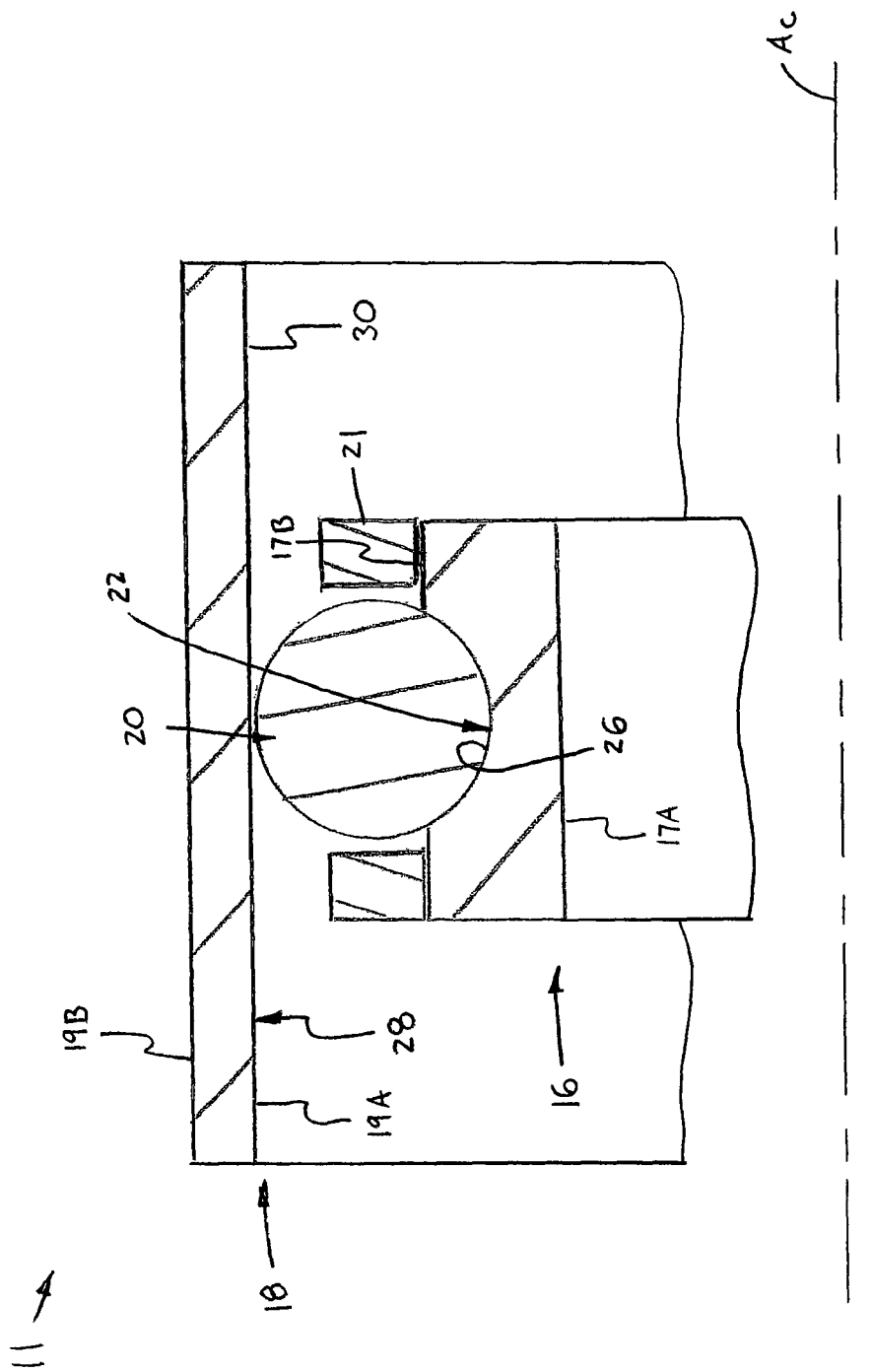

HIGH-SPEED BEARING WITH GROOVED AND CYLINDRICAL RACES

CROSS-REFERENCE

This application claims priority to U.S. Provisional Patent Application No. 62/904,098 filed on Sep. 23, 2019, the entire contents of which are fully incorporated herein by reference.

BACKGROUND OF THE INVENTION

The present invention relates to bearings, and particularly to bearings used in high-speed shaft applications.

Bearings used in relatively high-speed applications, such as a gas turbine engine, typically include one or more rows of cylindrical rollers. When there is relative axial displacement between the components supported by such cylindrical roller bearings, which may be half the length of the roller, the rollers must slide axially along a line of contact between the rollers and the bearing races.

SUMMARY OF THE INVENTION

The present invention is a high-speed shaft assembly comprising a shaft formed of a first material and having a central axis an outer member formed of a second material and disposed about the shaft. At least one of the shaft and the outer member is rotatable about the central axis, the second material having a coefficient of thermal expansion substantially different than the coefficient of thermal expansion of the first material. As such, at least one of the shaft and the outer member is displaceable along the central axis relative to other one of the shaft and the outer member at temperatures greater than 120° Celsius and at temperatures less than −18° Celsius. A bearing inner ring is disposed about and coupled with the shaft, the inner ring having an outer circumferential surface providing an inner race, the inner race being either a substantially cylindrical surface or an annular groove. A bearing outer ring is disposed about the inner ring and is coupled with the outer member, the outer ring has an inner circumferential surface providing an outer race, the outer race being the other one of substantially cylindrical surface and an annular groove. Further, a plurality of balls is disposed between the inner and outer races so as to rotatably couple the inner and outer rings, each ball being displaceable axially along the cylindrical race surface during relative axial displacement of the shaft and the outer member.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 3 is an enlarged, broken-away portion of FIG. 2;

DETAILED DESCRIPTION OF THE INVENTION

Figure 2:
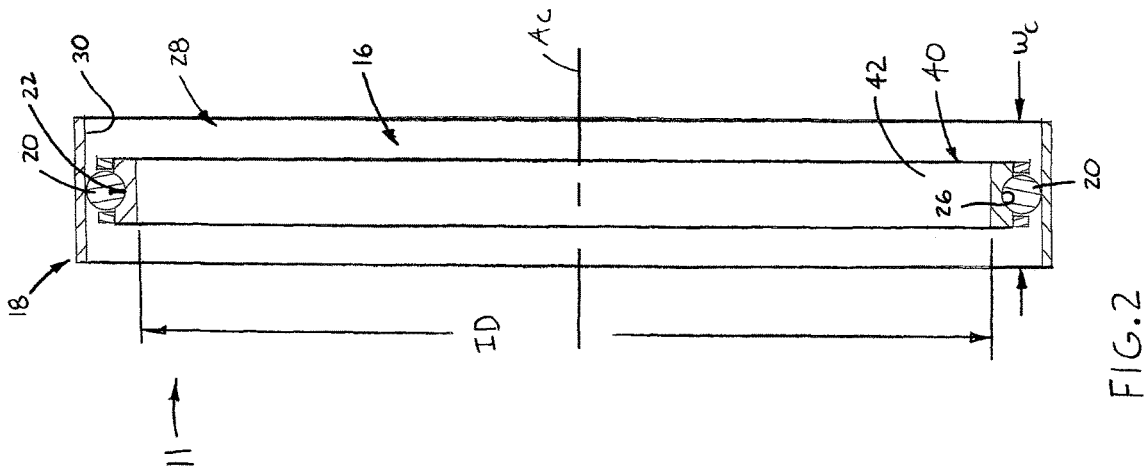
FIG. 2 is an axial cross-sectional of a high-speed bearing of FIG. 1, shown separate from a shaft and an outer member.
Figure 1:
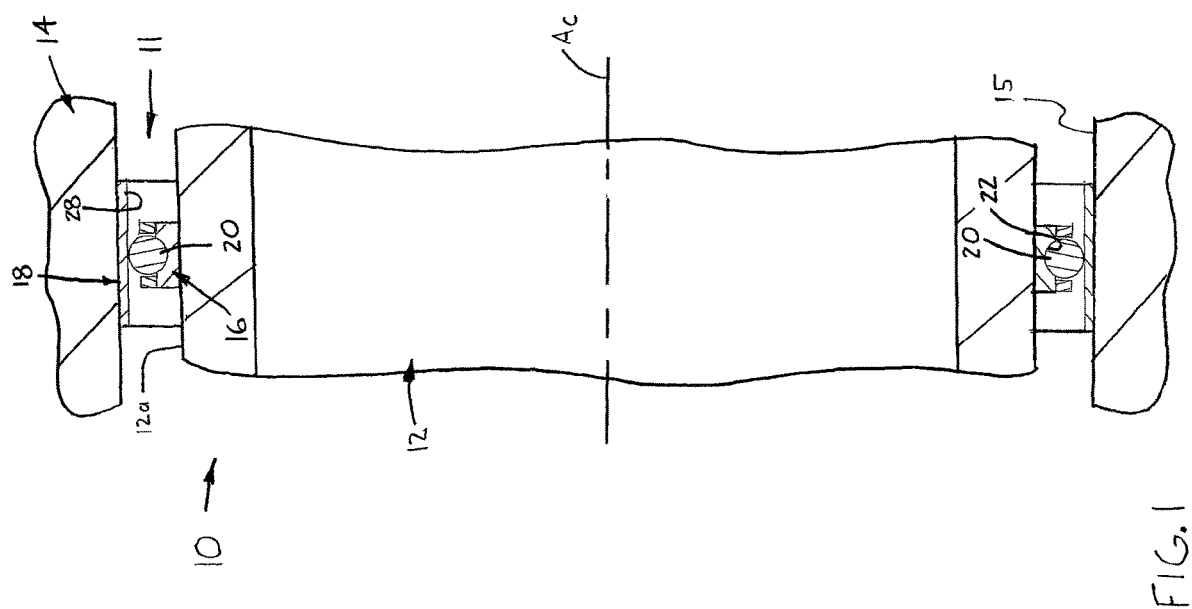
FIG. 1 is an axial cross-sectional view of a high-speed shaft assembly in accordance with the present invention, shown with a high-speed bearing having a deep groove inner race and a cylindrical outer race.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-11 a high-speed shaft assembly 10, including a bearing 11, for use in a gas turbine engine, a compressor or other device in which components have rotational speeds which exceed one thousand rotations per minute (1000 rpm) and may reach tens of thousands rpm (e.g., 10,000 rpm, 30,000 rpm, etc.) and operate in either low temperatures, e.g., down to negative seventy-three degrees Celsius (−73° C.), or high temperatures, e.g., up to three hundred fifteen degrees Celsius (315° C.). The shaft assembly 10 basically comprises a shaft 12, an outer member 14 (e.g., a housing or housing component), an inner ring 16, an outer ring 18 and a plurality of balls 20 (i.e., spherical rollers), the rings 16, 18 and the balls 20 forming the bearing 11 which also includes a cage 21. The shaft 12 is formed of a first material, such as 4140 steel, 4340 steel, 9310 steel, etc. for the "cold section" and nickel alloy and similar materials for the "hot section", is preferably hollow (as depicted) and has an outer surface 12a and a central axis $A_C$. The outer member 14 is formed of a second material, for example magnesium or Inconel (hot section), titanium (cold section), is disposed about the shaft 12 and has an inner circumferential surface 14*a*.

At least one of the shaft 12 and the outer member 14 is rotatable about the central axis $A_C$ at relatively high rotational speeds as discussed above. In certain applications, the shaft 12 rotates relative to a fixed outer member 14, in other applications the outer member 14 rotates relative to a fixed shaft 12, and in yet other applications, both the shaft 12 and the outer member 14 rotate at different speeds and/or in different angular directions. Also, the second material forming the outer member 14 has a coefficient of thermal expansion substantially different than the coefficient of thermal expansion of the first material forming the shaft 10, either substantially greater or substantially lesser. As such, at least one of the shaft 12 and the outer member 14 is displaceable along the central axis $A_C$ relative to other one of the shaft 12 and the outer member 14 at temperatures greater than one hundred twenty degree Celsius (120°) and at temperatures less than negative eighteen degrees Celsius (−18° C.). Due to the sizing of the components of the shaft assembly 10 and the machine (e.g., gas turbine engine, compressor, etc.) incorporating the shaft assembly 10, the relative axial displacement of the shaft 12 and the outer member 14 is relatively substantial, as discussed below.

Further, the bearing inner ring 16 is disposed about and coupled with the shaft 12 and has an inner circumferential surface 17A and an outer circumferential surface 17B providing an inner race 22. The inner race 22 is either a substantially cylindrical surface 24 (FIGS. 4-6, 8 and 10) or an annular groove 26 (FIGS. 1-3, 7 and 9) extending radially inwardly from the outer surface 17B, and is preferably formed as a "deep groove" race as is known to those skilled in the bearing arts. The bearing outer ring 18 is disposed about the inner ring 16 and is coupled with the outer member 14. The outer ring 18 has an inner circumferential surface 19A providing an outer race 28 and an opposing outer circumferential surface 19B, which is preferably press-fit against the inner surface 15 of the outer member 14 or the inner circumferential surface of an intermediate member 13 (FIG. 11) (e.g., a sleeve, spacer, etc.). The outer race 28 is formed as the other one of a substantially cylindrical surface and an annular groove; in other words, the outer race 28 is a cylindrical bearing surface 30 (provided by the inner circumferential surface 19A) (FIGS. 1-3, 7 and 9) when the inner race 22 is formed as the annular groove 26 or the outer race 28 is formed as an annular groove 32 (FIGS. 4-6, 8 and 10) extending radially outwardly from the inner surface 17A when the inner race 22 is formed as the cylindrical surface 24.

In either case, the plurality of balls 20 are disposed between the inner and outer races 22, 28, respectively, so as to rotatably couple the inner and outer rings 16, 18, respectively, and thereby also rotatably couple the shaft 12 and the outer member 14. Each one of the plurality of balls 20 is displaceable axially along the cylindrical race surface 24 or 30 during relative axial displacement of the shaft 12 and the outer member 14. Thus, by forming either the inner race 22 or the outer race 28 as a cylindrical bearing surface 24 or 30, respectively, the balls 20 are capable of rollably displacing axially during relative axial displacement of the shaft 12 and the outer member 14, either due to thermal expansion at elevated temperatures or thermal contraction at reduced temperatures. Such axial displacement of each ball 20 occurs at substantially lower friction as compared with a cylindrical roller due to the balls 20 making point contact with the cylindrical bearing surface 24 or 30 rather than line contact as with a cylindrical roller. Although the axial displacement of the balls 20 may be about the entire width $w_C$ (FIGS. 2 and 5) of the cylindrical race surface 24 or 30, the axial displacement is preferably up to about half the cylindrical surface width $w_C$ as the balls 20 are preferably located generally centrally on the surface 24 or 30 under normal operating conditions.

Figure 5:
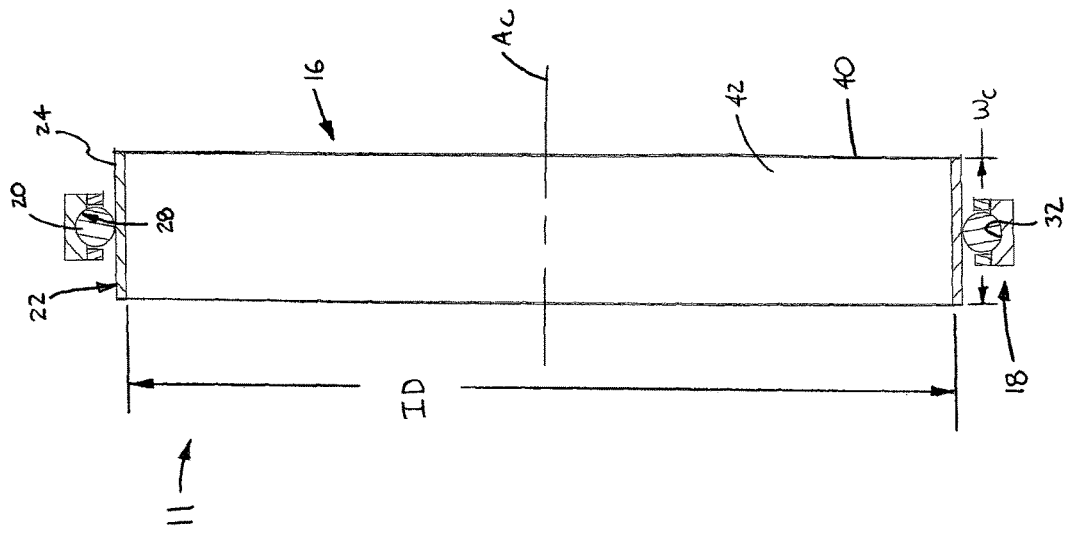
FIG. 5 is an axial cross-sectional of the high-speed bearing of FIG. 4, shown separate from the shaft and the outer member.
Figure 4:
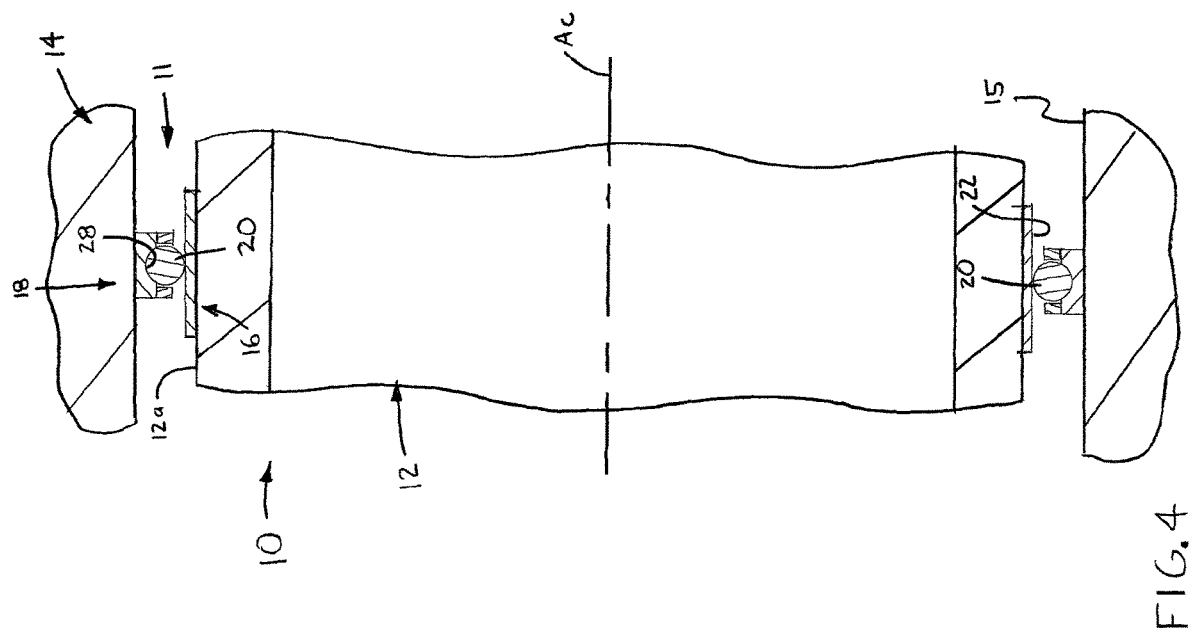
FIG. 4 is an axial cross-sectional view of a high-speed shaft assembly in accordance with the present invention, shown with a high-speed bearing having a cylindrical inner race and a deep groove outer race.
Figure 6:
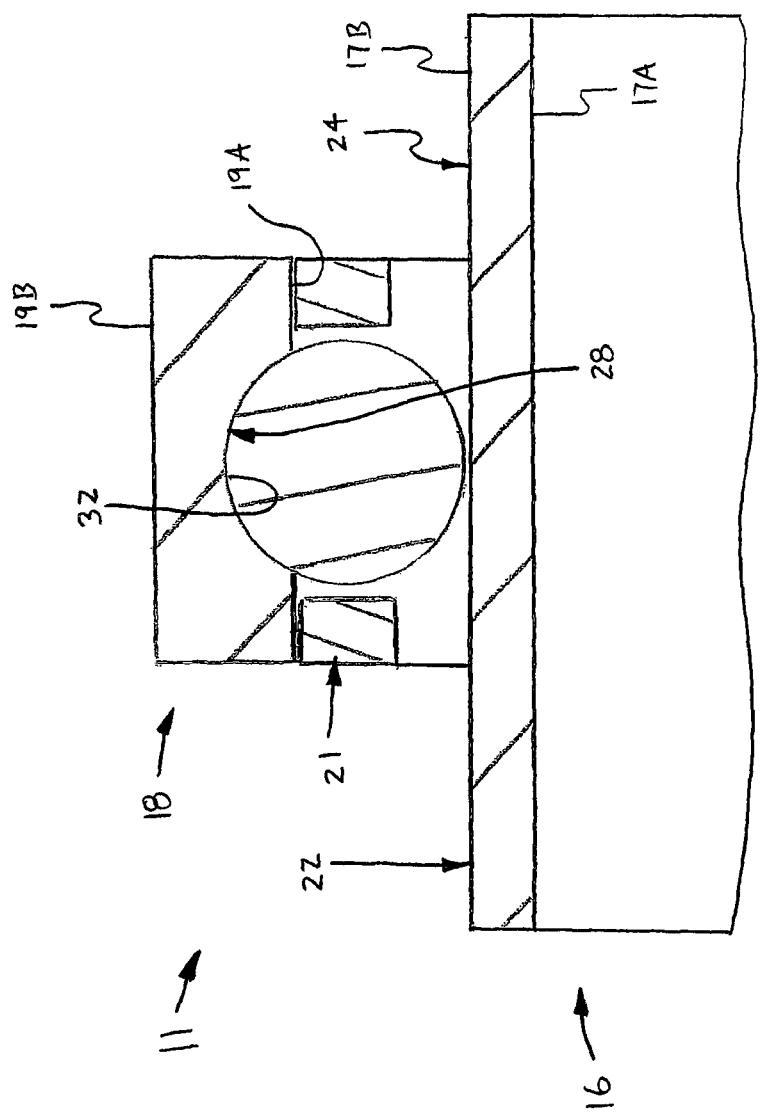
FIG. 6 is an enlarged, broken-away portion of FIG. 5.
Figure 7:
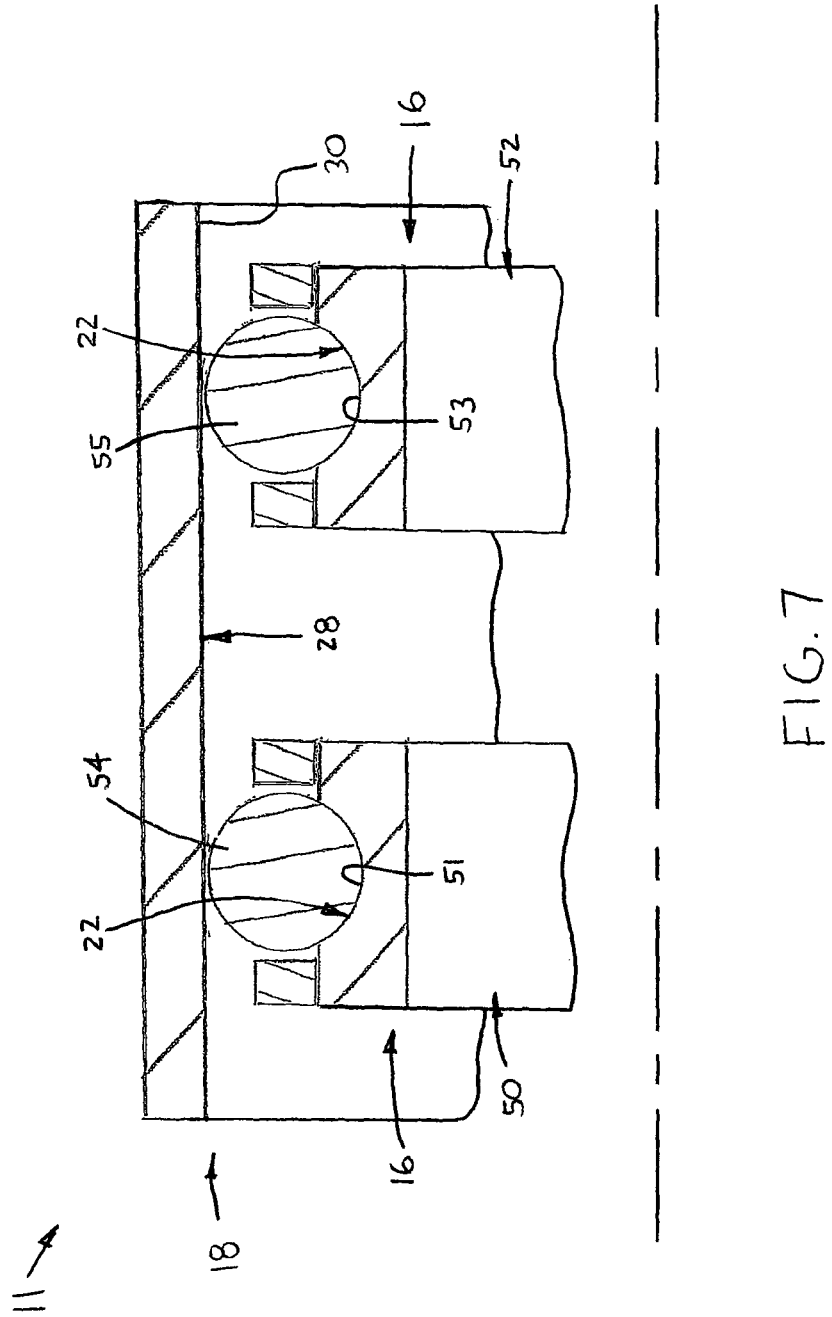
FIG. 7 is an enlarged, broken-away axial cross-sectional view of a high-speed bearing having two inner rings and a single outer ring.
Figure 8:
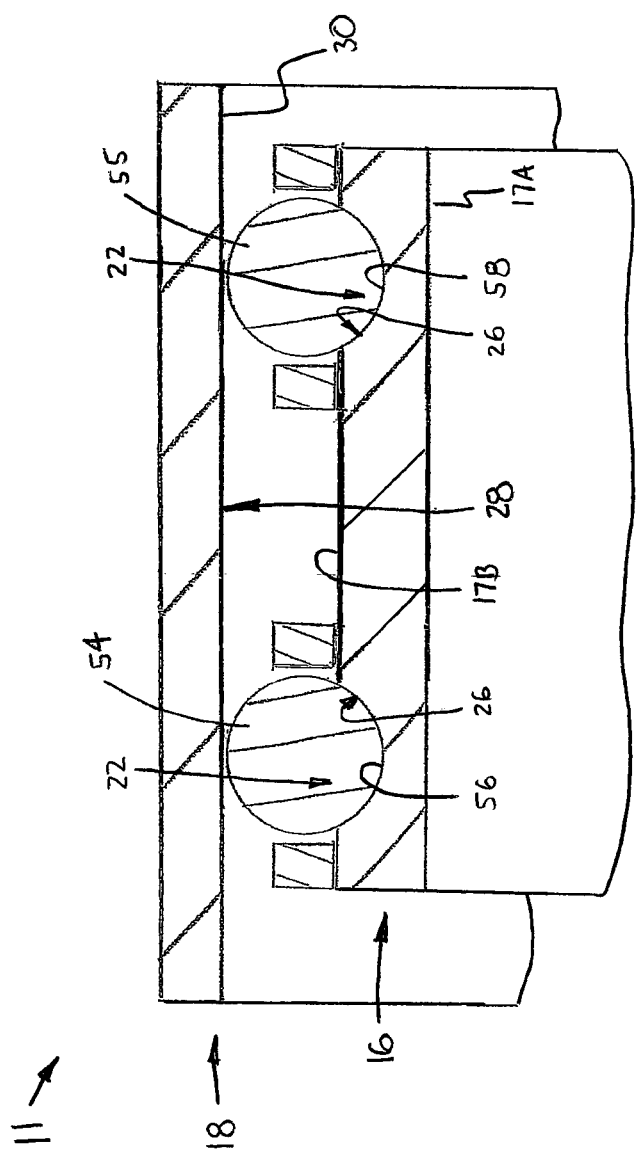
FIG. 8 is an enlarged, broken-away axial cross-sectional view of a high-speed bearing having an inner ring with two races.
Figure 9:
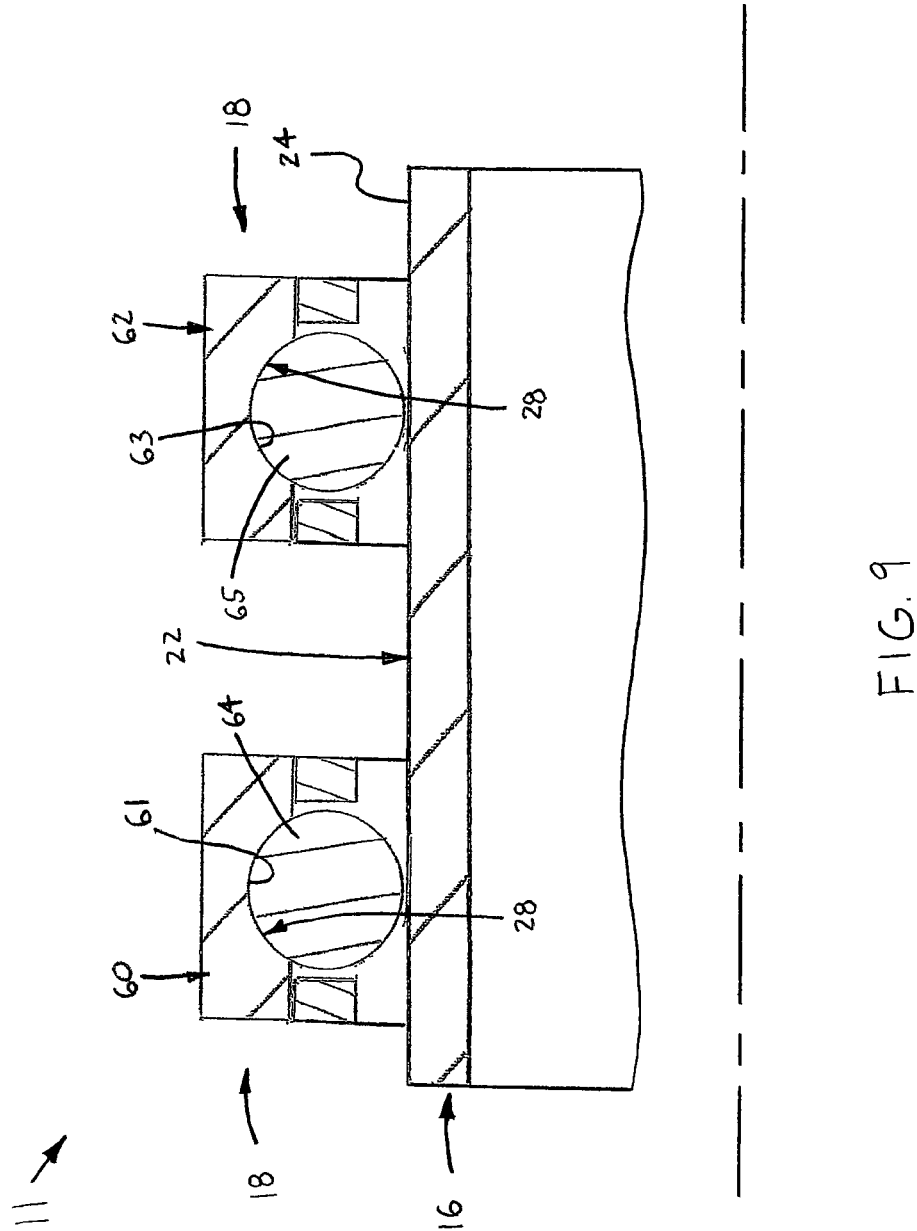
FIG. 9 is an enlarged, broken-away axial cross-sectional view of a high-speed bearing having a single inner ring and two outer rings.
Figure 10:
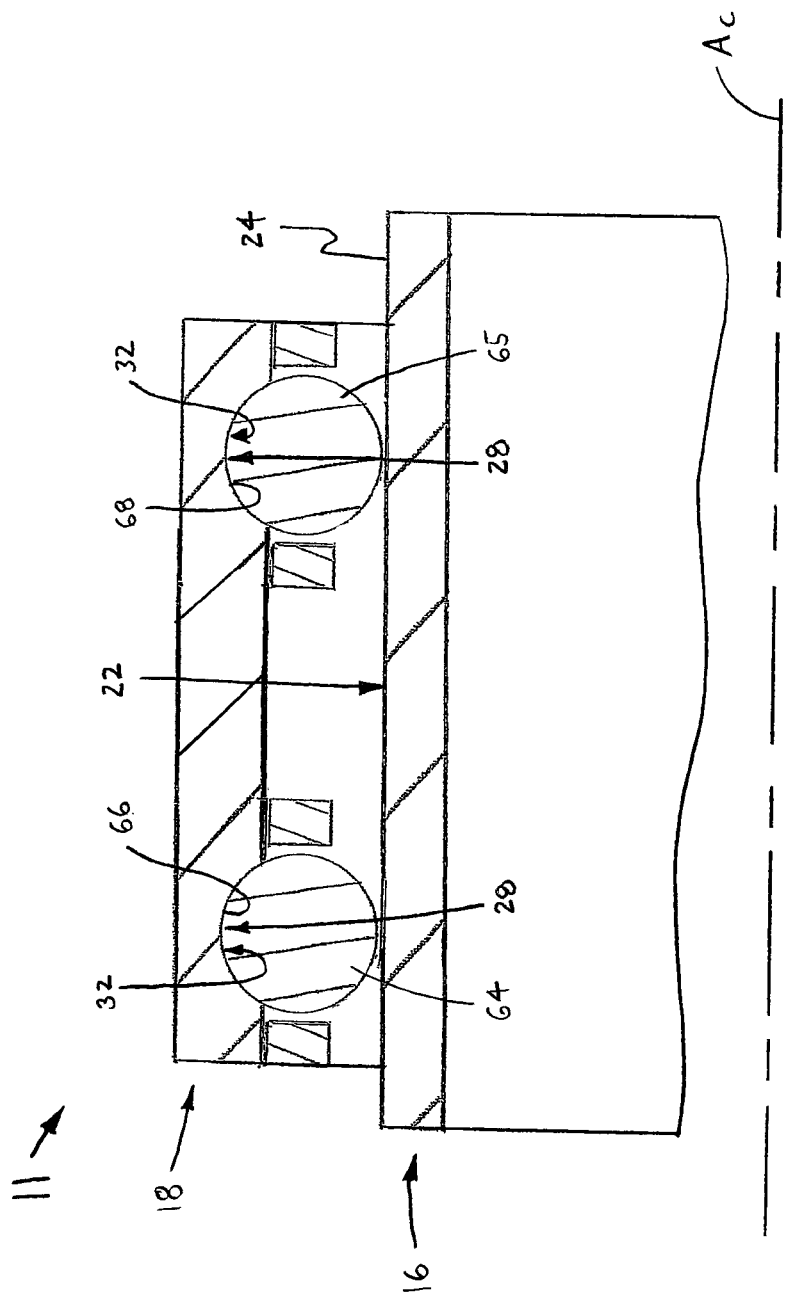
FIG. 10 is an enlarged, broken-away axial cross-sectional view of a high-speed bearing having an outer ring with two races.
Figure 11:
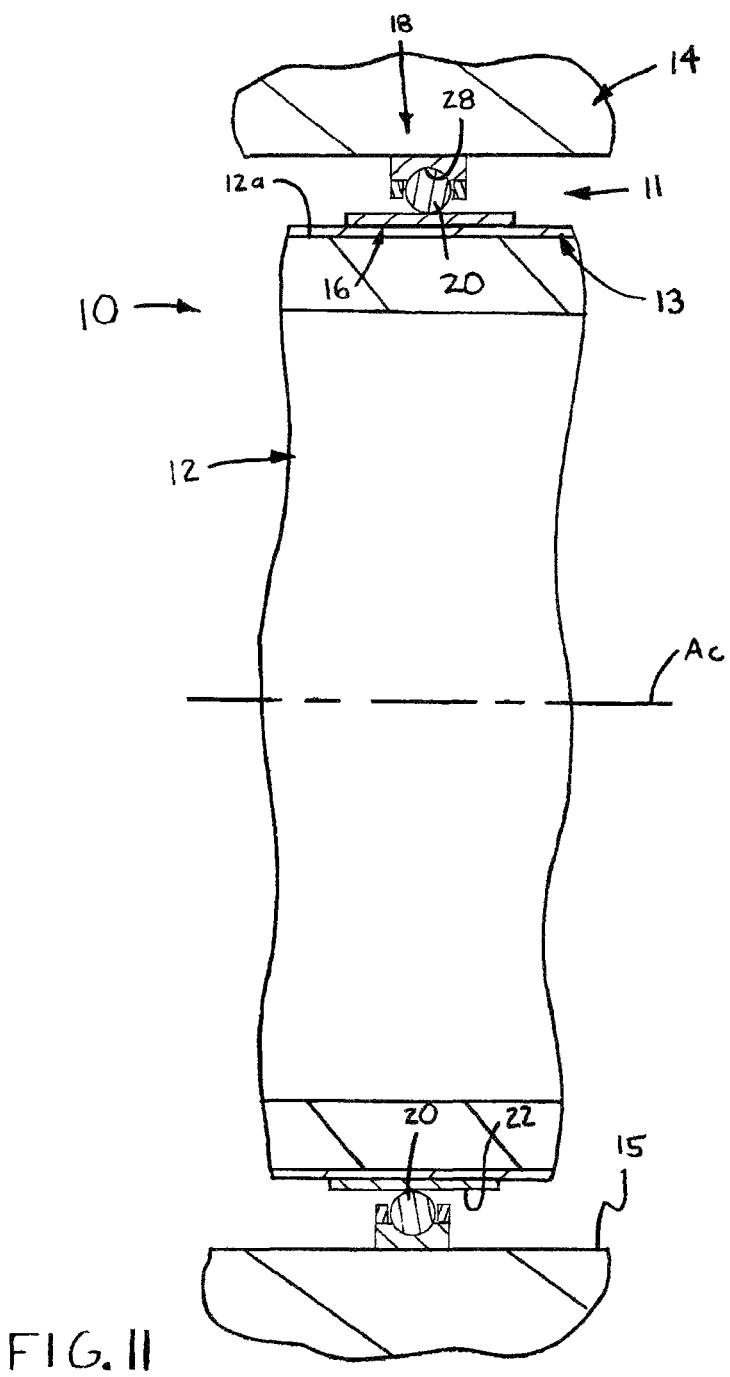
FIG. 11 is an axial cross-sectional view of a high-speed shaft assembly in accordance with the present invention, shown with a high-speed bearing having a cylindrical inner race disposed about a sleeve and a deep groove outer race.

Referring to FIGS. 2 and 5, the bearing 11 is a "high-speed" bearing as defined by having a DN factor or DN value of greater than one million, the DN value being defined as the product of the bearing diameter and the rotational speed of the bearing. Specifically, the inner ring 16 includes a generally cylindrical annular body 40 with a bore 42 having an inside diameter ID, as indicated in FIGS. 2 and 5. The annular body 40 of the inner ring 16 is sized such that the product of the rotational speed of the shaft 12, or the rotational speed of the outer member 14, and the value of the bore diameter ID, expressed in millimeters, is greater than one million; in other words, DN value=rotational speed× ID≥1,000,000. The DN value or factor is used to indicate higher speeds for bearings as the tangential velocities and stresses are significantly higher in a "larger sized" bearing as compared with a relatively smaller sized bearing rotating at similar rotational velocities, for example, a bearing incorporated into a dental drill.

Referring to FIGS. 7-10, the bearing 11 may include two or more inner rings 16 with race grooves 26 (FIG. 7), a single inner ring 16 with two or more grooves 26 (FIG. 8), two outer rings 18 each with a groove 32 (FIG. 9) or a single outer ring 18 with two or more grooves 32 (FIG. 10), coupled either with a single outer ring 18 with a cylindrical race surface 30 (FIGS. 7 and 8) or an single inner ring 16 with a cylindrical race surface 24 as appropriate and including a second (or third or more) set of balls 20. More specifically, with a bearing 11 having an outer race 28 formed as a cylindrical race surface 30, the inner ring 12 may be a first inner ring 50 with a first race groove 51 and the bearing 11 further comprises a second inner ring 52 (and possibly three or more inner rings) with a second race groove 53, a first plurality or set of balls 54 being disposed between the first groove 51 and the outer cylindrical race surface 30 and a second set of balls 55 being disposed between the second groove 53 and the outer race surface 30. Alternatively, the inner ring 16 may be formed with two (or more) annular grooves 26, specifically a first groove 56, a second groove 58, etc., the grooves 56, 58, etc. being spaced axially apart on the ring outer surface 17B, with first and second sets of balls 54, 55. In either case, the outer ring 18 has an axial length sized such that the ring 18 extends beyond the axial ends of the two rings 50, 52, or of the single inner ring 16, by a sufficient distance to permit axial displacement of the two sets of balls 54, 55.

Further, with a bearing 11 having an inner race 22 formed as a cylindrical race surface 24, the outer ring 18 may be a first outer ring 60 with a first race groove 61 and the bearing 11 further comprises a second outer ring 62 (and possibly three or more inner rings) with a second race groove 63, a first plurality or set of balls 64 being disposed between the first groove 61 and the inner cylindrical race surface 24 and a second set of balls 65 being disposed between the second groove 63 and the inner race surface 24. Alternatively, the outer ring 18 may be formed with two (or more) annular grooves 32, specifically a first groove 66, a second groove 68, etc., the grooves 66, 68, etc. being spaced axially apart on the ring inner surface 19A, with first and second sets of balls 64, 65. In either case, the inner ring 16 has an axial length sized such that the ring 16 extends beyond the axial ends of the two rings 60, 62, or the single outer ring 18, by a sufficient distance to permit axial displacement of the balls 64, 65.

Some advantages of any of the multi-row designs described above is that multiple rows of balls 20 will allow for a lower radial foot print in comparison with a single row of balls 20 and that resistance or compliance to moment loading can be adjusted by increasing spacing between the rows.

Preferably, the inner ring 16 and the outer ring 18 are each made of aerospace grade steel materials such as M50, M50 NiL, 440C stainless, Pyrowear 675 or any other material of similar strength and having similar properties. The cage 21 is preferably made of hardened 4340 steel with silver plating of 0.001"-0.002" and is preferably balanced to five (5) gram-centimeters or tighter to optimize high-speed performance. Also, the balls 20 are preferably made of a ceramic or silicon nitride material, but may be made of the same aerospace grade steel materials as the rings 16, 18.

Further, each one of the bearing inner ring 16 and the bearing outer ring 18 are preferably heat treated to prevent substantial dimensional changes between negative seventy-three degrees Celsius (−73° C.) and three hundred fifteen degrees Celsius (315° C.). Such heat treatment may be through-hardening, carburizing, nitriding, carbo-nitriding or any combination of these or other treatment processes.

Furthermore, the various components of the high-speed bearing 11 are preferably formed to relatively higher precision or tolerances, most preferably meeting or exceeding the requirements of the American Bearing Manufacturers Association (ABMA) ABEC 5 rating. Also, the bearing components, in particular the inner ring 16, are fit within the shaft assembly 10 with tighter tolerances to prevent potentially adverse effects experienced with "high-speed" rotation as discussed above. Preferably, the inner ring 16 is connected with the shaft 12, or an intermediate member 13 (FIG. 11) such as a sleeve, spacer, etc., disposed between the ring 16 and the shaft 12, by an interference fit that generates at least sixty-nine megapascals (69 MPa) of hoop stress within the inner ring 14. As such, the effects of centrifugal growth during high-speed rotation are substantially reduced.

The high-speed bearing 11 of the present invention has a number of advantages over previously known bearings for similar applications. Current bearings with cylindrical rollers are prone to skidding/sliding, tilting or skewing at high rotational speeds due to light radial loading, and as such, often must incorporate intentional "out of round" to impart artificial radial loads to prevent such skidding damage. In the present invention, the balls 20 are significantly more stable at higher rotation speeds, and friction is substantially reduced when the balls 20 displace axially, compared with cylindrical rollers. Also, the balls 20 have a substantially greater radius in comparison with the corner of a cylindrical roller and by having balls 20, the high-speed bearing 11 does not have misalignment issues as with bearings which include cylindrical rollers. Further, with the preferred balls 20 formed of a ceramic material, potential damage during assembly of the balls 20 into the rings 16, 18 is significantly reduced as ceramic is substantially harder than steel, and lubrication requirements are considerably decreased.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A high-speed shaft assembly comprising:
a shaft formed of a first material and having a central axis;
an outer member formed of a second material and disposed about the shaft, at least one of the shaft and the outer member being rotatable about the central axis, the second material having a coefficient of thermal expansion different than a coefficient of thermal expansion of the first material such that at least one of the shaft and the outer member is displaceable along the central axis relative to other one of the shaft and the outer member at temperatures greater than 120° Celsius and at temperatures less than −18° Celsius;
a bearing inner ring disposed about and coupled with the shaft, the inner ring having an outer circumferential surface providing an inner race, the inner race being one of a substantially cylindrical surface and an annular groove;
a bearing outer ring disposed about the inner ring and coupled with the outer member, the outer ring having an inner circumferential surface providing an outer race, the outer race being the other one of the substantially cylindrical surface and the annular groove; and
a plurality of balls disposed between the inner and outer races so as to rotatably couple the inner and outer rings, each ball being displaceable axially along the substantially cylindrical surface during relative axial displacement of the shaft and the outer member;
wherein each one of the bearing inner ring and the bearing outer ring are heat treated to prevent substantial dimensional changes between negative seventy-three degrees Celsius (−73° C.) and three hundred fifteen degrees Celsius (315° C.).

2. The shaft assembly as recited in claim 1 wherein the inner ring has a bore with a diameter and a product of the rotational speed of the shaft or the outer member and a value of the bore diameter in millimeters is greater than one million.

3. The shaft assembly as recited in claim 1 wherein the substantially cylindrical surface has a width and the relative axial displacement of the shaft or of the outer member is up to about half the width of the substantially cylindrical surface.

4. The shaft assembly as recited in claim 1 wherein each one of the balls is formed of a ceramic material.

5. The shaft assembly as recited in claim 1 wherein the one of the inner ring and the outer ring having the annular groove includes another annular groove and the shaft assembly further comprises another plurality of balls disposed within the other annular groove and rollable circumferentially about the axis and axially along the substantially cylindrical surface.

6. The shaft assembly as recited in claim 1 wherein the inner ring is connected with the shaft or an intermediate member disposed upon the shaft by an interference fit, the interference fit generating at least sixty-nine megapascals (69 MPa) of hoop stress within the inner ring.

7. The shaft assembly as recited in claim 1 wherein each one of the bearing inner ring and the bearing outer ring are at least one of hardened, carburized, nitrided and carbonitrided.

8. A high-speed shaft assembly comprising:
a shaft formed of a first material and having a central axis;
an outer member formed of a second material and disposed about the shaft, at least one of the shaft and the outer member being rotatable about the central axis, the second material having a coefficient of thermal expansion different than a coefficient of thermal expansion of the first material such that at least one of the shaft and the outer member is displaceable along the central axis relative to other one of the shaft and the outer member at temperatures greater than 120° Celsius and at temperatures less than −18° Celsius;
at least one bearing inner ring disposed about and coupled with the shaft, the inner ring having an outer circumferential surface and an annular groove extending inwardly from the outer surface and providing an inner race;
a bearing outer ring disposed about the at least one inner ring and coupled with the outer member, the outer ring having a cylindrical inner circumferential surface providing an outer race; and
a plurality of balls disposed between the inner and outer races so as to rotatably couple the inner and outer rings, each ball being displaceable axially along the outer race during relative axial displacement of the shaft and the outer member;
wherein the at least one inner ring is a first bearing inner ring providing a first inner race, the plurality of balls is a first set of balls and one of:
the shaft assembly further comprises a second bearing inner ring disposed about and coupled with the shaft, the second inner ring having an outer circumferential surface and annular groove extending inwardly from the outer surface and providing a second inner race and a second set of balls disposed between the second inner race and the outer race; and
the inner ring includes another annular groove spaced axially from the annular groove and the shaft assembly further comprises another plurality of balls disposed within the other annular groove and rollable circumferentially and axially along the outer race.

9. A high-speed shaft assembly comprising:
a shaft formed of a first material and having a central axis;
an outer member formed of a second material and disposed about the shaft, at least one of the shaft and the outer member being rotatable about the central axis, the second material having a coefficient of thermal expansion different than a coefficient of thermal expansion of the first material such that at least one of the shaft and the outer member is displaceable along the central axis relative to other one of the shaft and the outer member at temperatures greater than 120° Celsius and at temperatures less than −18° Celsius;
a bearing inner ring disposed about and coupled with the shaft, the inner ring having an outer circumferential surface providing a cylindrical inner race;
a bearing outer ring disposed about the inner ring and coupled with the outer member, the outer ring having an inner circumferential surface and an annular groove extending into the inner surface and providing an outer race; and
a plurality of balls disposed between the inner and outer races so as to rotatably couple the inner and outer rings, each ball being displaceable axially along the cylindrical inner race during relative axial displacement of the shaft and the outer member;
wherein each one of the bearing inner ring and the bearing outer ring are heat treated to prevent substantial dimensional changes between negative seventy-three degrees Celsius (−73° C.) and three hundred fifteen degrees Celsius (315° C.).

* * * * *